(12) United States Patent
Roessler et al.

(10) Patent No.: US 11,337,101 B2
(45) Date of Patent: May 17, 2022

(54) METHOD FOR MANAGING A VIRTUAL RADIO ACCESS NETWORK AND METHOD FOR CALIBRATING A SOFTWARE COMPONENT

(71) Applicant: Alcatel Lucent, Nozay (FR)

(72) Inventors: Horst Roessler, Stuttgart (DE); Peter Schefczik, Stuttgart (DE); Fariborz Derakhshan, Nuremberg (DE)

(73) Assignee: Alcatel Lucent, Nozay (FR)

( * ) Notice: Subject to any disclaimer, the term of this patent is extended or adjusted under 35 U.S.C. 154(b) by 490 days.

(21) Appl. No.: 16/323,378

(22) PCT Filed: Aug. 1, 2017

(86) PCT No.: PCT/EP2017/069463
§ 371 (c)(1),
(2) Date: Feb. 5, 2019

(87) PCT Pub. No.: WO2018/029047
PCT Pub. Date: Feb. 15, 2018

(65) Prior Publication Data
US 2021/0289385 A1    Sep. 16, 2021

(30) Foreign Application Priority Data
Aug. 9, 2016  (EP) .................... 16306037

(51) Int. Cl.
*H04L 41/0893*    (2022.01)
*H04L 41/00*    (2022.01)
(Continued)

(52) U.S. Cl.
CPC ...... *H04W 28/0205* (2013.01); *G06F 9/5077* (2013.01); *H04L 41/0893* (2013.01); *H04L 41/20* (2013.01); *H04W 28/0925* (2020.05)

(58) Field of Classification Search
CPC .......... H04W 28/0205; H04W 28/0925; H04L 41/20; H04L 41/0893; G06F 9/5077
See application file for complete search history.

(56) References Cited

U.S. PATENT DOCUMENTS 8,276,140 B1 * 9/2012 Beda, III .............. G06F 9/5077
                                                                718/1
8,397,088 B1   3/2013 Ghose
(Continued)

FOREIGN PATENT DOCUMENTS

EP    2 955 631 A1   12/2015
JP    2006-173666 A   6/2006
(Continued)

OTHER PUBLICATIONS

Ahnmisunetal:"A research on VNF-enabled radio access network for UDN using low-cost compute node", Oct. 28, 2015(Oct. 28, 2015),pp. 846-848, (Year: 2015).*
(Continued)

*Primary Examiner* — Asghar H Bilgrami
(74) *Attorney, Agent, or Firm* — Fay Sharpe LLP

(57) ABSTRACT

A method for managing a virtual radio access network which serves a radio cell is provided. The method includes selecting, based on a radio access technology of the radio cell, a construction scheme for the virtual radio access network in a repository. Further, the method includes querying, from the repository, at least one software component associated to the construction scheme. The software component represents a virtualized network function of the virtual radio access network. The method additionally includes setting up, using the software component, the virtualized network function on a runtime platform according to the construction scheme.

16 Claims, 6 Drawing Sheets

(51) Int. Cl.
  *H04L 41/0803* (2022.01)
  *H04L 41/14* (2022.01)
  *H04W 28/02* (2009.01)
  *G06F 9/50* (2006.01)
  *H04W 28/08* (2009.01)

(56) References Cited

U.S. PATENT DOCUMENTS

| | | | |
|---|---|---|---|
| 2012/0042061 A1 | 2/2012 | Ayala et al. | |
| 2012/0254647 A1 | 10/2012 | Joshi et al. | |
| 2013/0275961 A1 | 10/2013 | Anderson et al. | |
| 2015/0082308 A1* | 3/2015 | Kiess | G06F 9/45558 |
| | | | 718/1 |
| 2016/0127169 A1* | 5/2016 | Rosa de Sousa Teixeira | |
| | | | H04L 43/08 |
| | | | 370/216 |

FOREIGN PATENT DOCUMENTS

| | | | | |
|---|---|---|---|---|
| JP | 2015-56182 A | | 3/2015 | |
| WO | WO 2015-169370 A1 | * | 11/2015 | ............ H04W 16/18 |
| WO | WO 2015/169370 A1 | | 11/2015 | |

OTHER PUBLICATIONS

Ahn Misun et al., "A research on VNF-enabled Radio Access Network for UDN using Low-cost Compute Node," 2015 International Conference on Information and Communication Technology Convergence (ICTC), IEEE, pp. 846-848, XP032829982, 2015.

International Search Report for PCT/EP2017/069463 dated Feb. 8, 2018.

English Bibliography of Japanese Patent Application Publication No. JP2015056182A, published Mar. 23, 2015, Printed from Derwent Innovation on Apr. 3, 2020, 5 pages.

European Patent Application No. 16306037.9, Partial European Search Report, dated Jan. 5, 2017, 8 pages.

European Patent Application No. 16306037.9, Extended European Search Report, dated Apr. 5, 2017, 15 pages.

PCT Patent Application No. PCT/EP2017/069463, Written Opinion of the International Searching Authority, dated Feb. 8, 2018, 8 pages.

English Bibliography of Japanese Patent Application Publication No. JP2006173666A, published Jun. 29, 2006, Printed from Derwent Innovation on Feb. 25, 2022, 7 pages.

* cited by examiner

METHOD FOR MANAGING A VIRTUAL RADIO ACCESS NETWORK AND METHOD FOR CALIBRATING A SOFTWARE COMPONENT

FIELD

Examples relate to virtual radio access networks. In particular, examples relate to a method for managing a virtual radio access network which serves a radio cell, and to a method for calibrating a software component which represents a virtualized network function of a virtual radio access network.

BACKGROUND

Cloud computing is a model for enabling ubiquitous and convenient on demand network access to a shared pool of configurable computing resources (e.g. networks, servers, storage, applications, and services) that can be rapidly provisioned and released with minimal management effort or service provider interaction.

Communication protocols incorporate different resource requirements compared to general purpose applications. In general, applications may be executed on almost any server or client platform. However, telecommunication protocols—specifically baseband functionality in the Radio Access Network (RAN) context—require a minimum performance to meet latency and throughput requirements. Therefore, dedicated hardware is still a standard in the RAN field.

Virtual Radio Access Network (vRAN; also known as Cloud-RAN or Centralized R-RAN, C-RAN) is an architecture in which the required baseband and protocol processing for one or more radio cells is performed on centralized computing resources or cloud infrastructure. vRAN extends the flexibility through abstraction (virtualization) of the execution environment.

In a vRAN, (essential) parts of the RAN (e.g. the LTE stack) are executed on General Purpose Processing (GPP) platforms. With the dissemination of multi core platforms which enable for binding tasks (processes or threads) to a single core or a set of cores to enhance their performance, core affinity became an essential feature in the field of cloud resource management.

However, conventional cloud management systems do not allow individual vRAN set-up and management. Moreover, specific resource consumption and performance behavior as required for baseband functionality is not efficiently managed.

Hence, there may be a desired for efficient vRAN set-up and management as well as for resource and performance monitoring.

SUMMARY

According to a first aspect of the present disclosure, it is provided a method for managing a vRAN which serves a radio cell. The method comprises selecting, based on a radio access technology of the radio cell, a construction scheme for the vRAN in a repository. Further, the method comprises querying, from the repository, at least one software component associated to the construction scheme. The software component represents a virtualized network function of the vRAN. The method additionally comprises setting up, using the software component, the virtualized network function on a runtime platform according to the construction scheme.

In some examples, the construction scheme for the vRAN is further selected based on a number of users to be served by the radio cell and/or a configuration of the runtime platform and/or a constraint of the radio cell's radio access technology.

According to some examples, the repository comprises a plurality of versions of the software component representing the virtualized network function, each version being calibrated for a specific runtime platform configuration and/or a specific fronthaul configuration, wherein querying the at least one software component associated to the construction scheme from the repository is based on a configuration of the runtime platform and/or a constraint of the radio cell's radio access technology.

In some examples, setting up the virtualized network function on the runtime platform comprises allocating a number of processor cores of the runtime platform to the software component which represents the virtualized network function based on a total number of processor cores of the runtime platform and/or information on a default allocation setting stored in the repository together with the software component.

According to some examples, the method further comprises monitoring a load of the number of processor cores allocated to the software component as well as changing the number of the processor cores allocated to the software component if a first load condition is satisfied.

In some examples, the method further comprises setting up a clone of the software component representing the virtualized network function on the runtime platform if a second load condition is satisfied as well as distributing network traffic in the vRAN to the software component representing the virtualized network function and the clone of the software component representing the virtualized network function.

According to some examples, the software component is a software container.

In some examples, the virtualized network function represents at least part of a communication protocol used in the radio cell's radio access technology.

According to a second aspect of the present disclosure, it is provided a method for calibrating a software component which represents a virtualized network function of a vRAN. The method comprises allocating a first number of processor cores of a runtime platform hosting the software component to the software component for a first calibration phase, and a second number of processor cores for a second calibration phase. Further, the method comprises varying a network traffic input to the software component for the first calibration phase and for the second calibration phase. The method also comprises monitoring a performance indicator of the software component for the first calibration phase and the second calibration phase. Moreover, the method comprises selecting the first number of processor cores as default allocation setting for the software component if the performance indicator of the software component for the first calibration phase is superior to the performance indicator of the software component for the second calibration phase, and vice versa.

In some examples, the method further comprises storing information on the default allocation setting together with the software component in a repository, the repository comprising at least one construction scheme for the vRAN, wherein the software component is associated to the construction scheme.

According to some examples, the method further comprises storing information on a configuration of the runtime platform hosting the software component during the first calibration phase together with the software component in the repository.

In some examples, the method further comprises storing information on the performance indicator of the software component for the default allocation setting together with the software component in the repository.

According to some examples, the method further comprises monitoring the performance indicator of the software component for a plurality of further calibration phases, wherein for each calibration phase the number of processor cores allocated to the software component is different. The method further comprises determining a maximum number and/or a minimum number of processor cores allocated the software component for which the performance indicator of the software component satisfies a quality criterion during the respective calibration phase. Additionally, the method comprises storing information on the maximum number and/or the minimum number of processor cores together with the software component in the repository.

In some examples, the performance indicator of the software component is based on the ratio between the network traffic input to the software component and the network traffic output by the software component.

According to a third aspect of the present disclosure, it is provided a computer program having a program code for performing the above method for managing a vRAN or the above method for calibrating a software component, when the computer program is executed on a computer or processor.

BRIEF DESCRIPTION OF THE FIGURES

Some embodiments of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent", to name just a few examples).

The terminology used herein is for the purpose of describing particular examples and is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong, unless expressly defined otherwise herein.

Figure 1:
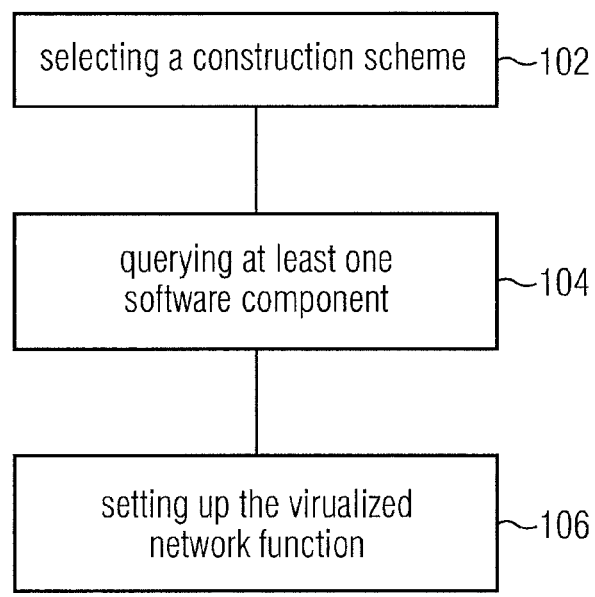
FIG. 1 illustrates a flowchart of an example of a method for managing a vRAN which serves a radio cell.

FIG. 1 illustrates a method for managing a vRAN which serves at least one radio cell. A vRAN is a network architecture where baseband and higher-layers operations of one or more base stations are executed on one or more centralized runtime platforms. A runtime platform is a specific combination of computing hardware and software configured to host the vRAN. For example, the runtime platform is a specific combination of computing hardware and an operating system (kernel) for hosting the functionalities of the vRAN. The runtime platform may, e.g., be a cloud computing system. The one or more centralized runtime platforms are connected to one or more Remote Radio Heads (RRHs; also known as Radio Unit, RU) serving the at least one radio cell via a fronthaul. An RRH is located remote from the one or more centralized runtime platforms and may provide transmit, amplification, receiving, or antenna functionality. Therefore, the RRH may, e.g., comprise one or more antenna elements, circuitry operating at Radio Frequency (RF), Analog-to-Digital converters (ADCs), Digital-to-Analog Converters (DACs), or up-/down-conversion mixers. For example, the one or more centralized runtime platforms and the RRHs may be coupled via optical fiber using Common Public Radio Interface (CPRI).

The method 100 comprises selecting 102 a construction scheme for the vRAN in a repository. The repository is a storage location from which digital data (e.g. the construction scheme or software) may be retrieved, or to which digital data may be committed. The construction scheme is a plan which contains the structure of the vRAN as well as the vRAN's individual (software/functional) components and their interconnection. For different Radio Access Technologies (RATs), different structures of vRANs as well as different components may be required. Hence, the selection of the construction scheme is based on the (desired) RAT of the radio cell. The RAT may, for example, correspond to one of the mobile communication systems standardized by the 3rd Generation Partnership Project (3GPP), e.g., Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (E-UTRAN), Long Term Evolution (LTE) or LTE-Advanced (LTE-A), or correspond to mobile communication networks with different standards, e.g. Worldwide Interoperability for Microwave Access (WIMAX) IEEE 802.16 or WLAN IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. By selecting the construction scheme based on the (desired) RAT of the radio cell, a vRAN may be set up or managed which is designed specifically to the (desired) RAT of the radio cell.

Further, the method 100 comprises querying 104, from the repository, at least one software component associated to the construction scheme. The repository may, e.g., comprise a plurality of software components associated to the selected construction scheme or other construction schemes. The software component represents a Virtualized Network Function (VNF) of the vRAN. A conventional RAN comprises a plurality of network functions (e.g. routing, load balancing, protocol processing) which are executed by dedicated hardware. The VNF is a software implementation of a specific network function, so that at least part of the network functionality may be virtualized by one or more VNFs. That is, the VNFs may be regarded as building blocks of a vRAN. The software component is a piece of code which encapsulates functions and/or data related to the VNF. The software component may communicate with other software components or entities of the vRAN, or any other network node via an interface. The software component is associated to the construction scheme, i.e., the software component is suitable to be used for the specific construction scheme. For example, the software component may be listed or linked in the specific construction scheme.

The method 100 additionally comprises setting up 106, using the software component, the virtualized network function on a runtime platform according to the construction scheme. That is, the functionalities of the virtualized network function are made executable on the runtime platform. For example, setting up the virtualized network function may comprise compiling, installing, registering, configuring, calibrating or any other required operation to establish the executability of the virtualized network function on the runtime platform. The set-up is performed in accordance with the construction scheme. That is, one or more parameters of the virtualized network function may, e.g., be calibrated construction scheme specific (e.g. based on constraints of the RAT of the radio cell), or connections to other VNFs are established according to the construction scheme (e.g. exposed ports of the one VNF may be propagated as variables to another VNF). Accordingly, a vRAN or at least part of a vRAN may be set-up in an efficient manner on a runtime platform, which may be any GPP platform (e.g. a cloud computing system).

The method 100 may, hence, allow to set up functionalities of a vRAN using out-of-the-box software components on any runtime platform. Accordingly, a vRAN or a vRAN functionality for a specific RAT of a radio cell may be set-up in a facilitated manner. The repository may be made available to any service provider, thus enabling the service provider to easily set up a vRAN or a vRAN functionality via the accessible construction schemes and their associated software components.

In some examples, the construction scheme for the vRAN may be further selected based on a number of users to be served by the radio cell and/or a configuration of the runtime platform and/or a constraint of the radio cell's RAT. The number of users to be served by the radio cell is an indicator for the size of the radio cell (e.g. macro cell, pico cell, or femto cell). Accordingly, the number of users to be served by the radio cell may indicate an amount of network traffic to be processed by the vRAN or a specific VNF. Different construction schemes may be stored in the repository for different sizes of the radio cell. Hence, selecting the construction scheme for the vRAN based on the number of users to be served by the radio cell may allow to select a most suitable construction scheme for the size of the radio cell (i.e. for the amount of network traffic to be processed). Runtime platforms (e.g. cloud computing systems) may exhibit a variety of different combinations of hardware and software (or software version/release). Each combination may exhibit specific performance or execution characteristics. Different construction schemes may be stored in the repository for different configurations of the runtime platform. Hence, selecting the construction scheme for the vRAN based on the configuration of the runtime platform may allow to select a most suitable construction scheme for the configuration of the actual runtime platform hosting the VNF (i.e. for the combination of hardware and operating system hosting the VNF). A RAT may exhibit various constraints on the processing of data. For example, a processing time budget for protocol layers 1 to 3 is less than 3 ms (milliseconds) for LTE and less than 1 ms for 5G, or the LTE Hybrid Automatic Repeat Request (HARQ) requires a round trip of 8 ms. Different construction schemes may be stored in the repository for different constraints of the radio cell's RAT. Hence, selecting the construction scheme for the vRAN based on the constraint of the radio cell's RAT may allow to select a most suitable construction scheme for the constraint of the radio cell's RAT (i.e. a construction scheme which fulfills the constraint). That is, selecting the construction scheme based on one or more of the above parameters may allow to select a construction scheme for the vRAN which is better suited to the actual runtime platform and the required (desired) characteristics of the radio cell.

Further, the repository may in some examples comprise a plurality of versions of the software component representing the virtualized network function. Each version is calibrated for a specific runtime platform configuration and/or a specific (vRAN) fronthaul configuration. That is, the repository may provide specifically calibrated versions of the software component for different runtime platforms, different fronthauls, or combinations thereof. Accordingly, querying 104 the at least one software component associated to the construction scheme from the repository may be based on a configuration of the runtime platform and/or a constraint of the radio cell's RAT. As discussed above, different configurations of runtime platforms exhibit specific performance characteristics. Hence, querying the software component based on the configuration of the runtime platform may allow to select a most suitable software component for the configuration of the actual runtime platform hosting the VNF (i.e. for the combination of hardware and operating system hosting the VNF). Moreover, as discussed above, a RAT may exhibit various constraints on the processing of data. These constraints may also be influenced by one or more parameters of the vRAN's fronthaul. For example, the LTE HARQ requires a round trip of 8 ms which is including the baseband processing time and the fronthaul transport latency. Accordingly, the available baseband processing time may be determined by the fronthaul transport latency. Hence, querying the software component based on the constraint of the radio cell's RAT may allow to select a most suitable software component for the constraint of the radio cell's RAT (i.e. a software component which fulfills the constraint).

In some examples, setting up 106 the VNF on the runtime platform may comprise allocating a number of processor cores of the runtime platform to the software component which represents the VNF. The allocation is based on a total number of processor cores of the runtime platform and/or information on a default allocation setting stored in the repository together with the software component. The allocated number of processor cores corresponds to the fraction of the runtime platform's total processing resources which is allocated to the software component (i.e. the VNF). By selecting the number of allocated processor cores based on the total number of processor cores of the runtime platform, the number of allocated processor cores may adapted to the available processing resources of the runtime platform. Accordingly, the runtime platform's total processing resources may be distributed more effectively to the software component which represents the VNF, other software components representing VNFs, or any other software. By storing a default allocation setting in the repository together with the software component, a reference setting may be provided for the initial set up on the runtime platform. The default allocation setting may, e.g., represent an optimized processor core allocation obtained from a calibration process. Selecting the number of allocated processor cores based on the default allocation setting may allow to initially set up the VNF on the runtime platform with a well-functioning configuration, which may, e.g., be updated during the further operation of the vRAN.

Hence, the method 100 may in some examples further comprise monitoring a load of the number of processor cores allocated to the software component. Therefore, one or more Key Performance Indicators (KPIs) may be defined and monitored during the operation of the vRAN. If a first load condition is satisfied, the method may further comprise changing the number of the processor cores allocated to the software component. The first load condition may, e.g., indicate that the allocated processor cores are merely able to cope with a slight increase in network traffic. For example, the first load condition may be that the load of the allocated processor cores is more than 80%, 85%, 90%, 95%, or 98%. Accordingly, situations where the load of the allocated processor cores is (almost) 100%, or overload occurs may be avoided. In other words, resources of the runtime platform which are allocated to the software component (i.e. the VNF) may be scaled. Hence, the stability and the scalability of the vRAN system may be improved.

Alternatively, the method 100 may further comprise setting up a clone of the software component representing the VNF on the runtime platform if a second load condition is satisfied. Allocating additional processor cores to a software component may sometimes result in merely a slight increase of performance, or even adversely affect the performance. Hence, it may be more efficient to set up (start) a clone of the software component representing the VNF on the runtime platform. The second load condition is therefore different from the first load condition. The second load condition may, e.g., indicate that the allocated processor cores are merely able to cope with a slight increase network traffic and that increasing the number of allocated processor cores does not significantly increase the performance of the software component representing the VNF. For example, the second load condition may be that the load of the allocated processor cores is more than 80%, 85%, 90%, 95%, or 98% and that the number of currently allocated processor cores is a predefined maximum number of processor cores to be allocated to the software component. The method 100 may additionally comprise distributing network traffic in the vRAN to the software component representing the virtualized network function and the clone of the software component representing the virtualized network function. That is, the network traffic to be processed by the VNF is divided between the software component and its clone, which both represent the VNF. Accordingly, both software components may be operated under optimal operation conditions. This may allow to save processing resources of the runtime platform compared to increasing the number of processor cores allocated to a single instance of the software component.

As indicated above, the VNF may, e.g., represent at least part of a communication protocol used in the radio cell's RAT. Accordingly, the protocol processing in the RAN may be partly or fully virtualized. As a consequence, the protocol processing may be executed on a GPP platform instead of dedicated hardware. This may allow to save costs for a network operator.

In some examples, the software component may be a software container. A software container is an isolated user-space instance. A software container enables a light weight virtualization of a (network) functionality. Similar to Virtual Machines (VMs), a software container preserves the advantage of virtualization in terms of flexibility, resource provisioning, decoupling, management and scaling. Moreover, a runtime performance is inferior compared to VMs. A fully encapsulated software container may enables services (e.g. VNFs) by creating a distribution model (e.g. a construction scheme for a vRAN) for the service applications.

Figure 2:
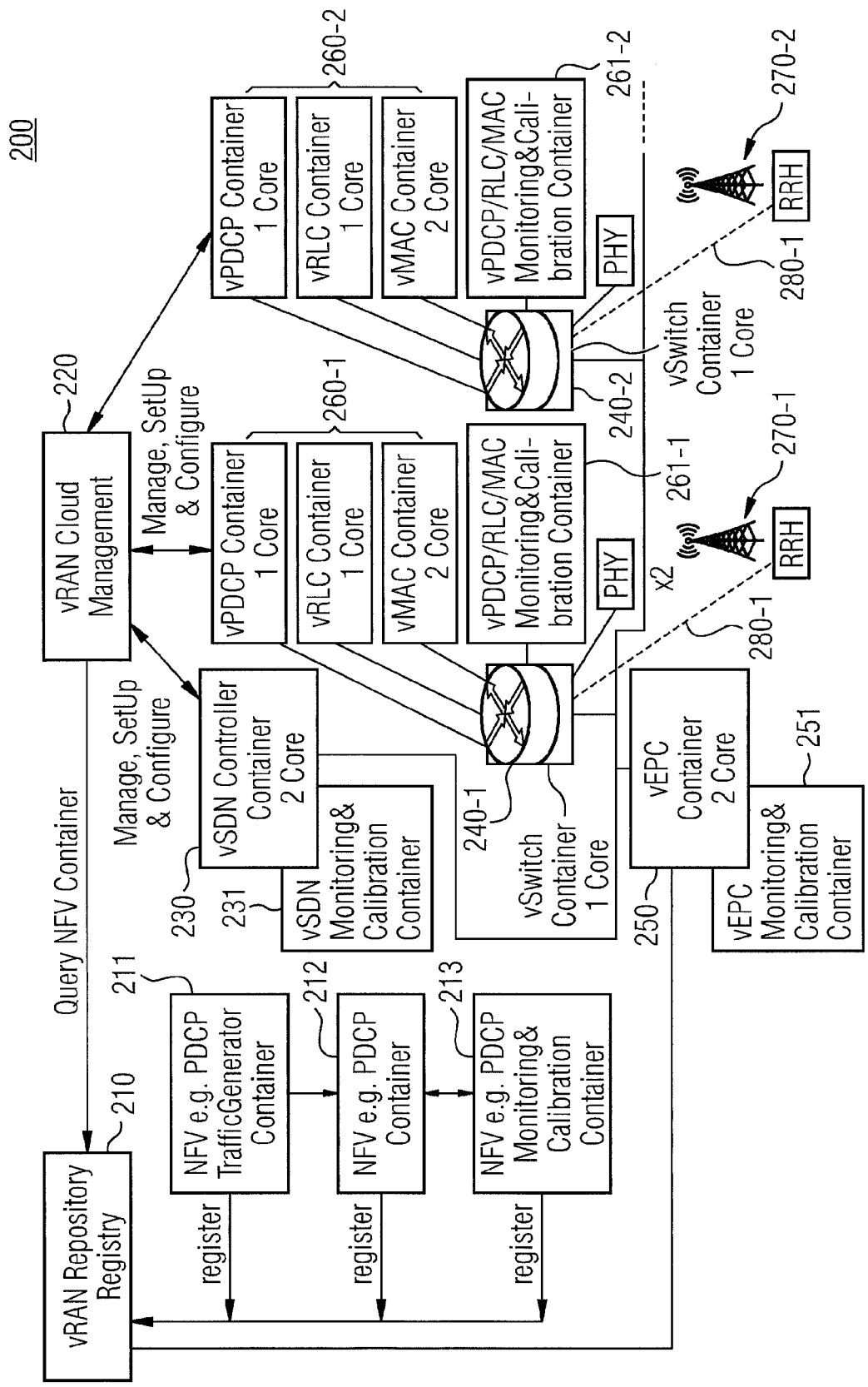
FIG. 2 illustrates an example of a managed vRAN system.

An example of a managed vRAN system 200 using software containers is illustrated in FIG. 2. The managed vRAN system 200 comprises a repository 210. The repository 210 comprises a plurality of construction schemes for vRANs and a plurality of the software containers associated to respective ones of the construction schemes.

As illustrated in the left part of FIG. 2, software containers representing functionalities of a VRAN may be registered in the repository 210 (i.e. the software containers may be committed to the repository 210). The terms "functionality of a VRAN" and "VNF" may be understood within the present disclosure in a general sense—not only containing code for imitating a pure RAN functionality, but also code for monitoring such a functionality or any other code for testing the functionality.

For example, in FIG. 2, the software container 212 represents the Packet Data Convergence Protocol (PDCP), which is located in the radio protocol stack in the UMTS and the LTE Air Interface on top of the Radio Link Control (RLC) layer. The PDCP provides its services to the Radio Resource Control (RRC) protocol and to user plane upper layers, e.g., the Internet Protocol (IP) at a User Equipment (UE). Moreover, the PDCP provides inter alia header compression to upper layers. The software container 212 represents the functionality of the PDCP, i.e., it may be understood as the virtualization of the PDCP. The software container 212 incorporates in this example a layer 2 LTE protocol. The PDCP software module (code) is isolated inside the container to prevent unintentional interferences. The container allows for resource allocation (e.g. number of cores) of the parent (host) operating system (i.e. resource allocation of the runtime platform). In other words, the software container 212 represents a VNF of the VRAN system 200.

Further, the software container 213 represents monitoring and calibration functionality for the software container 212, i.e., the virtualized PDCP. In other words, the software container 213 comprises code which allows to monitor and calibrate the software container 212. The software container 213 uses container monitoring facilities to observe the performance behavior as a function of the resource consumption (e.g. throughput versus number of cores or CPU load versus number of cores) of the PDCP container 212. Moreover, it may extract load vs. resource consumption characteristics by varying the resource allocation under different traffic situations.

The software container 211 represents a traffic generator for the software container 212. That is, the software container 211 comprises code which allows to generate artificial network traffic as an input for the software container 212. The software container 211 allows for typical PDCP (PDU) traffic generation which may emulate the traffic usually generated by the application (layer) considering also system KPIs.

For testing or calibrating the software container 212, which represents the PDCP, the software container 211 may generate network traffic as input for the software container 212. The software container 213 monitors and calibrates the software container 212. That is, the software containers 211, 212 and 213 represent VNFs. In other words, FIG. 2 illustrates a system architecture comprising e.g. the PDCP container 212 which needs to be calibrated and the PDCP specific traffic generator 211 and monitor & calibration container 213 performing the required calibration. The monitor container 213 may further comprise the calibration results (calibration output) in terms of default values, value ranges, curves etc. As indicated, the involved containers may be registered to the container repository 210 and, hence, be made available as platform optimized runtime images to the community.

As indicated in FIG. 2, the software containers may be registered to the repository 210. The individual software containers may be fetched and orchestrated by the cloud management system 220 as discussed in the following.

The vRAN cloud management system 220 does the orchestration, set-up and configuration of the whole vRAN system 200, which includes calibrated building blocks (in this example: software containers or container bundles) of VNFs. For example, a Software-Defined Networking (SDN) controller 230, switches 240-1 and 240-2, or an Evolved Packet Core (EPC) 250 may be virtualized using software containers. For example, these VNFs may be configured with more core computing resource capacity in order to guarantee a desired performance and resource usage due to fact that these functions are the key controlling entities of the system. For example, more processor cores may be allocated to the respective software containers. According monitoring and calibration software containers 231 and 251 may further be provided.

Moreover, the cloud management system 220 sets up and configures the PDCP, RLC, MAC container bundles 260-1 and 260-2 together with their specific monitoring and calibration containers 261-1 and 261-2. Accordingly, the VRAN system 200 may provide virtualized LTE functionalities.

Further, the virtualized LTE functionalities may be scaled on demand with efficient resource usage—e.g., by changing the number of processor cores allocated to the software container or by setting up a clone of a specific software container. The MAC container may also be configured with more computing resource capacity due to the radio resource scheduler which is a key component of a vRAN system.

The vRAN cloud management system may use the calibration result coming from the specific monitor container to optimize the resource consumption.

The vRAN management system 200 pulls (queries) the PDCP/RLC/MAC container bundle 260-1, 260-2 from the vRAN container repository 210 according to a construction for the vRAN system 200. That is, the vRAN cloud management system 220 discovers all the required type of components (containers) comprised by the actual construction scheme for building the complete vRAN system 200 serving a radio cell. Hence, a specific vRAN system 200 can be composed with all required calibrated components by means of orchestration, configuration and set up on the available runtime platform in order to provide a required execution performance and to enable for efficient resource usage. That is, the proposed vRAN construction scheme may essentially improve efficient vRAN cloud resource management.

Moreover, the monitor containers may optionally provide an interface towards the vRAN cloud management system 220 for providing details about the runtime platform (e.g. information on the hardware, software, or a version of an operating system) and calibration results.

As indicated in FIG. 2, the software containers executed on the runtime platform are coupled to two RRHs 270-1 and 270-2 by a respective fronthaul 280-1, 280-2 (e.g. optical fibers using CPRI). Accordingly, the managed vRAN system 200 may serve two radio cells.

Hence, the proposed vRAN cloud management system 220 (for virtualized communication protocols) may essentially improve efficient cloud resource management for orchestration, set up and configuration. Sharing calibrated system components may significantly improve VNF scalability, run time efficiency, management and deployment. The specific construction schemes and runtime performance (e.g. for 5G) as required by baseband processing functions are considered by the vRAN cloud management system 220.

Figure 3:
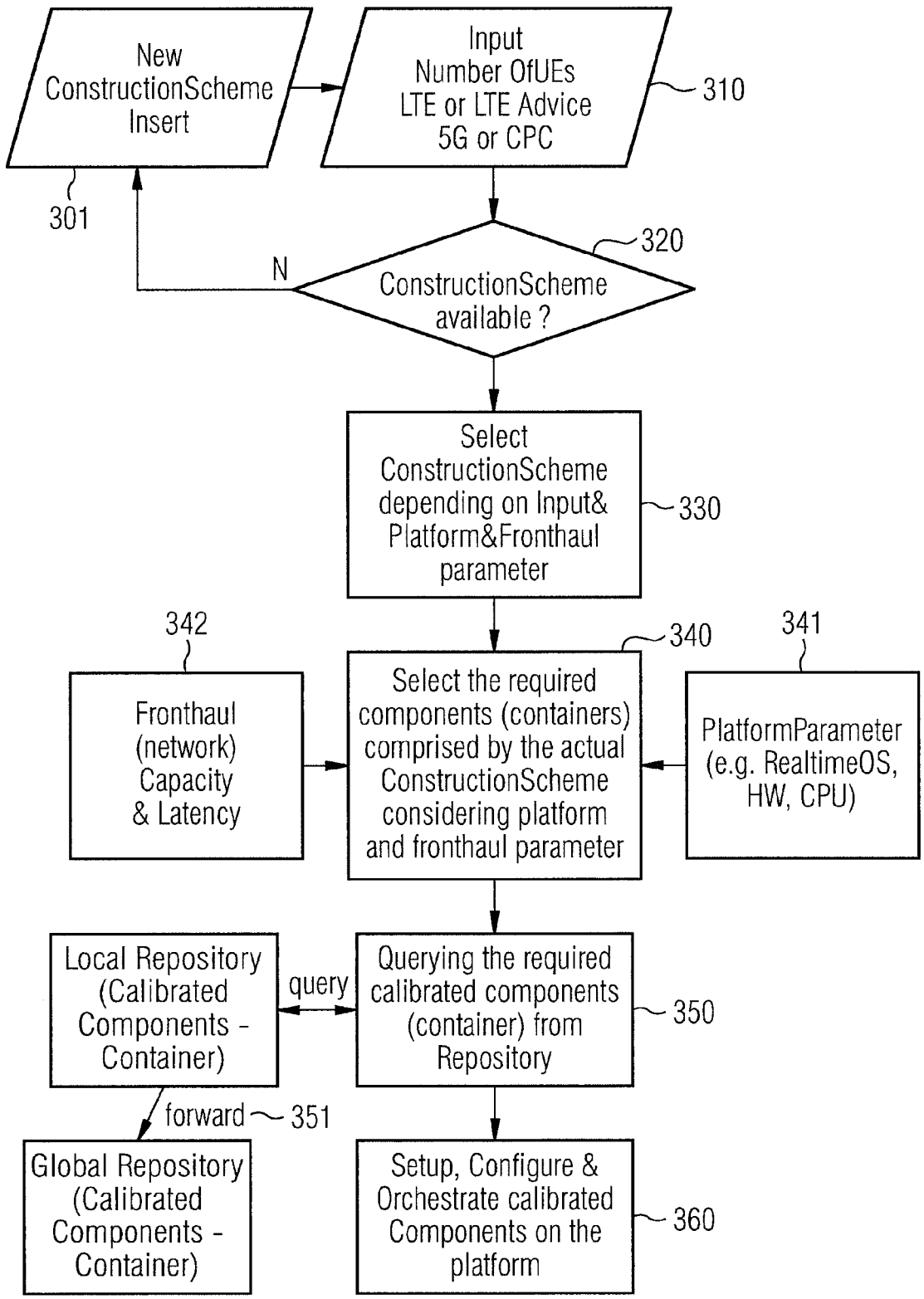
FIG. 3 illustrates a flowchart of another example of a method for managing a vRAN which serves a radio cell.

Another example of a method 300 for managing a vRAN which serves a radio cell is illustrated in FIG. 3. In other words, FIG. 3 illustrates the (main) tasks of the vRAN cloud management system 220 of the vRAN system illustrated in FIG. 2. Initially, a network operator provides his preferences by inputting the required vRAN type, e.g. LTE or 5G. Moreover, the network operator may provide the number of UEs (i.e. the number of users) the radio cell should serve as well as the processing time budget (e.g. less than 3 ms for LTE, and less than 1 ms for 5G). The RAT of the radio cell, the number of users to be served and the constraint of the radio cell's RAT determine the construction scheme for the vRAN.

Then, the repository is searched 320 for a required (suitable) construction scheme. If there is no required construction scheme, it may be provided 301 by the operator using, e.g., a specialization of a generic vRAN construction scheme template. As discussed above, the construction scheme contains references to all required virtualized components like SDN, EPC, switches, PDCP, RLC, MAC etc. If there is the required construction scheme, it is selected 330. For the selection of the required construction scheme further criteria may be used (e.g. configuration of the runtime platform, or parameter of the vRAN's fronthaul).

The vRAN cloud management system will discover 340 all the required type of components (e.g. containers) comprised by the actual construction scheme for building the complete vRAN system serving a radio cell. Additionally, specific runtime platform information 341 such as CPU type or a version of the operating system, and network parameter 342 of the fronthaul may allow for selection of appropriately calibrated components.

Then, the system queries 350 all the components (e.g. calibrated containers) from a local vRAN repository. If the local repository does not provide the requested entities, the query is automatically forwarded 351 to a global vRAN repository. The components (e.g. containers) are calibrated to the actual runtime platform and fit to the requested system type (LTE, 5G etc.).

Finally, the specific vRAN system can be composed 360 with all required calibrated components by means of orchestration, configuration and set up on the available runtime platform. Hence, a required execution performance may be provided while efficient resource usage of the runtime platform is enabled.

Figure 4:
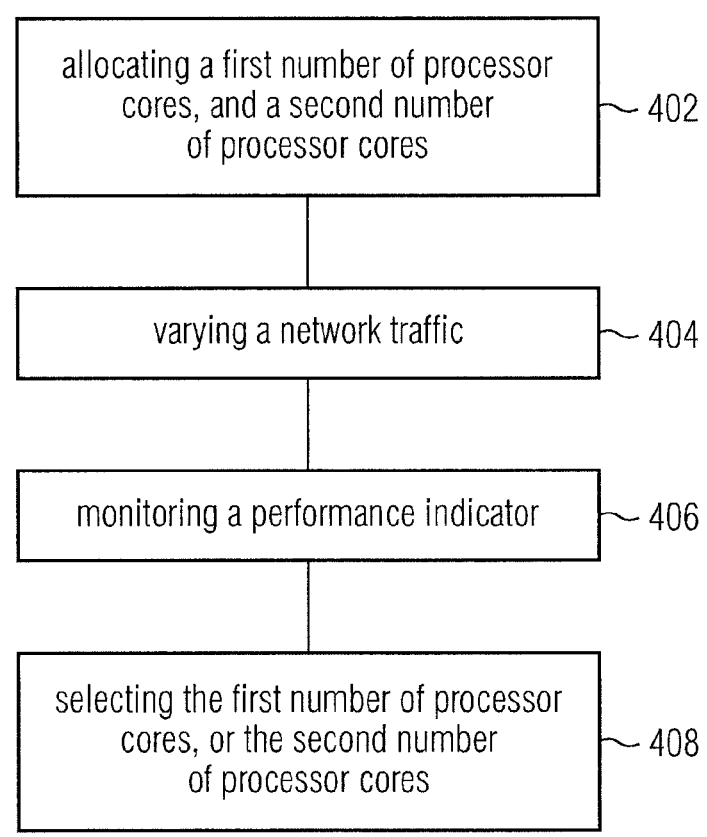
FIG. 4 illustrates a flowchart of an example of a method for calibrating a software component which represents a virtualized network function of a vRAN.

In the following, the calibration of software components representing VNFs of a vRAN are discussed. For this purpose, FIG. 4 illustrates a method 400 for calibrating a software component which represents a VNF of a vRAN.

The method 400 comprises allocating 402 a first number of processor cores of a runtime platform hosting the software component to the software component for a first calibration phase, and allocating a second number of processor cores to the software component for a different second calibration phase. That is, different fractions of the runtime platform's total processing resources are allocated to the software component for the two calibration phases.

Further, the method 400 comprises varying 404 a network traffic input to the software component for the first calibration phase and for the second calibration phase. For example, the network traffic provided as input to the software component may be increased or decreased over time during the first and second calibration phases. In general, the network traffic input to the software component may be varied arbitrarily during the first and second calibration phases as long as the variations are the same for the first and the second calibration phase.

The method 400 further comprises monitoring 406 a performance indicator of the software component for the first calibration phase and the second calibration phase. Accordingly, a performance response of the software component to the varied network traffic input may be monitored. The performance indicator may be a quantity that allows to judge a performance of the software component during a respective calibration phase.

Additionally, the method 400 further comprises selecting 408 the first number of processor cores as default allocation setting for the software component if the performance indicator of the software component for the first calibration phase is superior to the performance indicator of the software component for the second calibration phase, and vice versa.

The method may allow to select a number of allocated processor cores as default allocation setting for the software component which exhibits highest performance of the software component on the runtime platform. Accordingly, the default allocation setting for the software component may be used as a default setting on this or further runtime platforms.

In order to share the calibration results with other users, the method 400 may further comprise storing information on the default allocation setting together with the software component in a repository, wherein the repository comprises at least one construction scheme for the virtual radio access network, and wherein the software component is associated to the construction scheme. As discussed above, repositories with construction schemes for vRANs and associated software components may be used to set up and manage vRANs in a facilitated and resource saving way. By storing the default allocation setting together with the software component, a default setting for the set-up of the VNF on further runtime platforms may be stored in the repository. Accordingly, the VNF may be initially configured on further runtime platforms with a setting allowing high performance right from the beginning.

Moreover, the method 400 may further comprise storing information on a configuration of the runtime platform hosting the software component during the first calibration phase together with the software component in the repository. Runtime platforms (e.g. cloud computing systems) may exhibit a variety of different combinations of hardware and software (or software version/release). Each combination may exhibit specific performance and execution characteristics. Hence, storing information on the configuration of the runtime platform in the repository may allow to provide information which allow to select a most suitable software component for the set-up of the VNF on another runtime platform. For example, the stored information on the configuration of the runtime platform during calibration may allow a comparison with the configuration (hardware and/or software) of the other runtime platform.

The method 400 may further comprise storing information on the performance indicator of the software component for the default allocation setting together with the software component in the repository. The information on the performance indicator of the software component may allow to predict or estimate a behavior of the software component for different load conditions. Accordingly, these information may be used by another runtime platform, which queries the software component, for configuring (managing) the software component.

Moreover, the method 400 may further comprise monitoring the performance indicator of the software component for a plurality of further calibration phases, wherein for each calibration phase the number of processor cores allocated to the software component is different. That is, the performance indicator of the software component is monitored for a plurality of different numbers of allocated cores. Accordingly, information on the performance for different numbers of allocated processor cores is gathered. The method may further comprise determining a maximum number and/or a minimum number of processor cores allocated to the software component for which the performance indicator of the software component satisfies a quality criterion during the respective calibration phase. The quality criterion may be a criterion indicating a desired performance of the software component during operation. By determining the maximum number and/or the minimum number of allocated processor cores for which performance indicator satisfies the quality criterion, a range of allocated processor cores may be determined which guarantees sufficient performance of the software component. The maximum number and/or the minimum number of allocated processor cores for which performance indicator satisfies the quality criterion may be used as a configuration range by a runtime platform, which queries the software component. Thus, the method 400 may further comprise storing information on the maximum number and/or the minimum number of processor cores together with the software component in the repository. Accordingly, the information may be made available for other users/runtime platforms.

The performance indicator of the software component may, e.g., be based on the ratio between the network traffic input to the software component and the network traffic output by the software component. That is, the performance indicator may be the throughput of the software component. The throughput of the software component is an essential KPI since it directly indicates overload of the software container. Hence, it may be a clear performance indicator.

Figure 5:
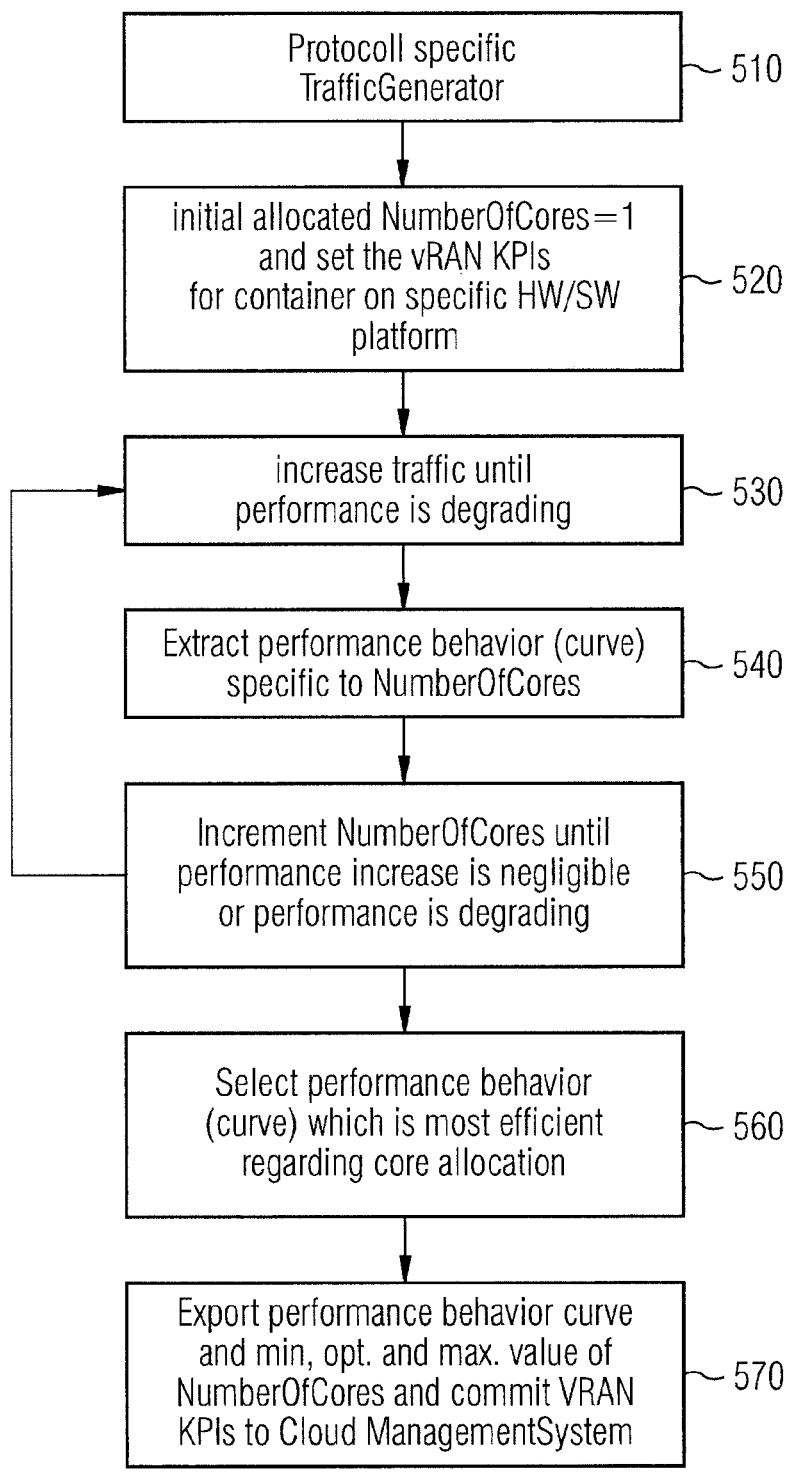
FIG. 5 illustrates a flowchart of an example of a method for calibrating a virtualized communication protocol.

Another exemplary method 500 for calibrating a software component which represents a virtualized network protocol in a vRAN is illustrated in FIG. 5. The purpose of method 500 is to analyze and generate (extract) specific load-resource consumption dependencies and to generate a container runtime image which can be optimized with respect to resource usage efficiency for a specific container runtime platform (hardware/operating system) while providing its service for a required number of UEs.

A software container representing a protocol specific traffic generator is used to generate 510 network traffic as input for the software component representing the network protocol. Further, an initial number of processor cores (e.g. 1 processor core) is allocated 520 to the software container representing the virtualized network protocol and KPIs for the specific runtime platform are selected. For a vRAN, the number of UEs served by a BaseBand Unit (BBU; i.e. the virtualized baseband functionalities executed on the runtime platform) and a processing time budget (e.g. for protocol layers 1 to 3 less than 3 ms for LTE and less than 1 ms for 5G) are KPIs and should be achieved by the system performance. Moreover the BBU timing requirements concerning fronthaul capacity (i.e. network capacity towards the RRH) and latency are limited in order to achieve a maximum latency. For example the LTE HARQ requires a round trip time of 8 ms, i.e., an upper limit for the sum of BBU processing time and fronthaul transport latency. Next Generation Mobile Networks (NGMN; e.g. using LTE-A) require a fronthaul maximum one-way latency of 250 μs (microseconds). As discussed above, performance calculation may use the ratio between incoming and outgoing traffic of, e.g., the PDCP layer while complying with the required number of served UE's and the processing time budget.

During the calibration process a monitor container observes the protocol containers performance under different load situations. In the method 500, the network traffic input to the software container representing the network protocol is increased 530 until the software container's performance decreases. The KPIs for the initially allocated number of processor cores are stored 540.

In the next cycle, the number of allocated processor cores is increased 550 and the same procedure is repeated with the increased number of allocated processor cores (e.g. 2 processor cores). The results of this cycle are compared with those of the previous cycle (e.g. with 1 processor core). The number of allocated processor cores is further increased and the respective KPIs are stored. Then, a KPI which is most efficient regarding the number of allocated cores is selected 560. For example, if the performance increase is negligible compared to the previous number of cores, a local optimum for the required number of users (UEs) to be served by the radio cell may be found. The so obtained number of processor cores and, e.g., number of users may be taken as reference by a vRAN management system in order to configure containers according to processing resources or as a threshold to dynamically scale up (on demand) before launching an additional VM or container.

This container image together with the resource parameters (i.e. the parameters of the runtime platform) and parameter ranges including vRAN specific parameter ranges may be exported 570 and thus be made available to a cloud management system. As discussed above, they may be accessed via a respective container repository containing the optimized protocol containers. The optional monitoring container can be used to dynamically adapt (scale) the resource allocation to different load situations during runtime.

The monitor software container stores the KPIs and constructs dependency functions (i.e. a mapping according to the construction scheme) between resource consumption (e.g. number of cores), performance and traffic volume. For this purpose, the monitor software container may, e.g., first scan the CPU multi core architecture and then perform the calibration method to analyze and determine the minimum, maximum and default amount of resources (e.g. CPU node and amount of processor cores) and store these values. It may then apply them to the protocol container and/or export them as recommended parameters to the cloud management system. That is, the calibration of software containers as discussed within the present disclosure may be performed offline (i.e. the software component is not part of an active vRAN processing real user data) or online (i.e. the software component is part of an active vRAN processing real user data).

The default number of processor cores may be a relative optimum where the number of threads (processes) is equal to the number of cores (i.e. the performance efficiency is optimal). The performance of the protocol (software container) may scale better in accordance with increasing traffic by using the default resource volume. The cloud management may use the reported values to find a trade-off between resource consumption and performance. Further the cloud management system may take into account the specific resource optimization for individual VMs or software containers in addition to the resource allocation and scalability of the whole cluster. Moreover, to increase the traffic beyond a level where the load of the allocated number of cores is almost 100%, a second software container (i.e. a clone) may be started instead of increasing the number of cores allocated to the first software container.

The monitor may detect an optimal number of cores for the protocol container by incrementing the number of cores during performance measurement in case that the number of paralleled threads meets the number of cores. Either the protocol container is only used for runtime within a protocol stack context or in combination with the monitor container which enables for dynamic adaption of resource consumption during runtime.

The result of the calibration method is an optimized virtualization of a protocol layer of a specific protocol stack for a specific runtime platform (i.e. combination of hardware and software release). This is important, as a change in hardware parameters or in the software may completely change the behavior of a system. The same is true for a change in the operating system or kernel of the host.

Figure 6:
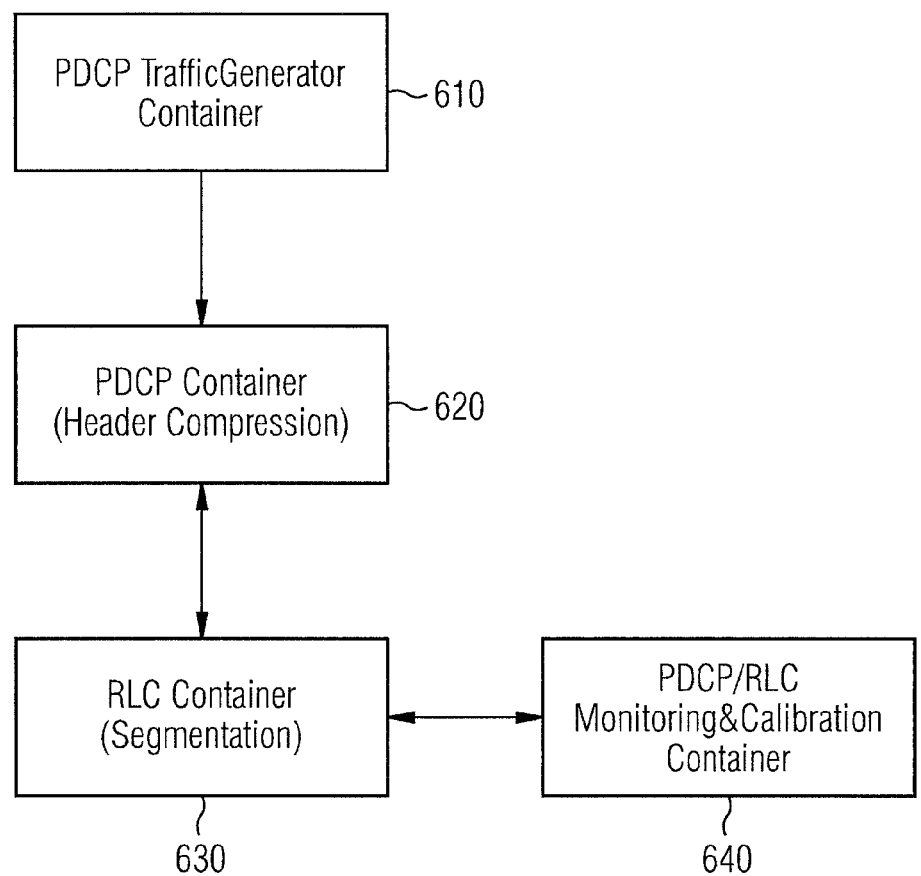
FIG. 6 illustrates an example of a configuration of software containers representing virtualized network functions of a vRAN.

Furthermore, the protocol software container may also be tested (system test) with other protocol layers on top and/or beneath whereas the monitor container may still be used for local monitoring and calibrating as illustrated in FIG. 6. In FIG. 6, the PDCP software container 620 and the RLC software container 630 are tested (calibrated) together using the PDCP traffic generation software container 610 and the monitoring and calibration software container 640.

The calibration result according to the proposed concept or one or more examples described herein is a set of, e.g., VMs or software containers (including optional monitoring). They may be made accessible from a repository for certain hardware and software platforms and optimized for efficient processing resource usage and runtime behavior while complying with the system KPIs.

The proposed vRAN cloud management for, e.g., virtualized communication protocols may improve efficient cloud resource management for orchestration, setup, and configuration (also at run time). Sharing calibrated system components may significantly improve VNF scalability, run time efficiency, management and deployment.

The aspects and features mentioned and described together with one or more of the previously detailed examples and figures, may as well be combined with one or more of the other examples in order to replace a like feature of the other example or in order to additionally introduce the feature to the other example.

Examples may further be a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for managing a virtual radio access network which serves a radio cell, comprising:
    selecting, based on a radio access technology of the radio cell, a construction scheme for the virtual radio access network in a repository;
    querying, from the repository, at least one software component associated to the construction scheme, wherein the software component represents a virtualized network function of the virtual radio access network; and
    setting up, using the software component, the virtualized network function on a runtime platform according to the construction scheme, wherein the setting up comprises allocating a number of processor cores of the runtime platform to the software component which represents the virtualized network function based on a total number of processor cores of the runtime platform and/or information on a default allocation setting stored in the repository together with the software component;

setting up a clone of the software component representing the virtualized network function on the runtime platform if a first load condition is satisfied; and distributing network traffic in the virtual radio access network to the software component representing the virtualized network function and the clone of the software component representing the virtualized network function;

wherein the software component comprises a Packet Data Convergence Protocol (PDCP) container.

2. The method of claim 1, wherein the construction scheme for the virtual radio access network is further selected based on a number of users to be served by the radio cell and/or a configuration of the runtime platform and/or a constraint of the radio cell's radio access technology.

3. The method of claim 1, wherein the repository comprises a plurality of versions of the software component representing the virtualized network function, each version being calibrated for a specific runtime platform configuration and/or a specific fronthaul configuration, and wherein querying the at least one software component associated to the construction scheme from the repository is based on a configuration of the runtime platform and/or a constraint of the radio cell's radio access technology.

4. The method of claim 1, further comprising:
monitoring a load of the number of processor cores allocated to the software component; and
changing the number of the processor cores allocated to the software component if a first load condition is satisfied.

5. The method of claim 1, wherein the virtualized network function represents at least part of a communication protocol used in the radio cell's radio access technology.

6. A non-transitory computer-readable medium storing program instructions that, when executed by a computer or a processor, cause at least one computing platform to perform the method of claim 1.

7. A method for managing a virtual radio access network which serves a radio cell, comprising:
selecting, based on a radio access technology of the radio cell, a construction scheme for the virtual radio access network in a repository;
querying, from the repository, at least one software component associated to the construction scheme, wherein the software component represents a virtualized network function of the virtual radio access network; and
setting up, using the software component, the virtualized network function on a runtime platform according to the construction scheme, wherein the setting up comprises allocating a number of processor cores of the runtime platform to the software component which represents the virtualized network function based on a total number of processor cores of the runtime platform and/or information on a default allocation setting stored in the repository together with the software component;
setting up a clone of the software component representing the virtualized network function on the runtime platform if a first load condition is satisfied; and
distributing network traffic in the virtual radio access network to the software component representing the virtualized network function and the clone of the software component representing the virtualized network function;
wherein the repository comprises a plurality of versions of the software component representing the virtualized network function, each version being calibrated for a specific runtime platform configuration and/or a specific fronthaul configuration;
wherein querying the at least one software component associated to the construction scheme from the repository is based on a configuration of the runtime platform and/or a constraint of the radio cell's radio access technology.

8. The method of claim 7, wherein the construction scheme for the virtual radio access network is further selected based on a number of users to be served by the radio cell and/or a configuration of the runtime platform and/or a constraint of the radio cell's radio access technology.

9. The method of claim 7, further comprising:
monitoring a load of the number of processor cores allocated to the software component; and
changing the number of the processor cores allocated to the software component if a first load condition is satisfied.

10. The method of claim 7, wherein the virtualized network function represents at least part of a communication protocol used in the radio cell's radio access technology.

11. A non-transitory computer-readable medium storing program instructions that, when executed by a computer or a processor, cause at least one computing platform to perform the method of claim 7.

12. A method for managing a virtual radio access network which serves a radio cell, comprising:
selecting, based on a radio access technology of the radio cell, a construction scheme for the virtual radio access network in a repository;
querying, from the repository, at least one software component associated to the construction scheme, wherein the software component represents a virtualized network function of the virtual radio access network;
setting up, using the software component, the virtualized network function on a runtime platform according to the construction scheme, wherein the setting up comprises allocating a number of processor cores of the runtime platform to the software component which represents the virtualized network function based on a total number of processor cores of the runtime platform and/or information on a default allocation setting stored in the repository together with the software component;
setting up a clone of the software component representing the virtualized network function on the runtime platform if a first load condition is satisfied; and
distributing network traffic in the virtual radio access network to the software component representing the virtualized network function and the clone of the software component representing the virtualized network function.

13. The method of claim 12, wherein the construction scheme for the virtual radio access network is further selected based on a number of users to be served by the radio cell and/or a configuration of the runtime platform and/or a constraint of the radio cell's radio access technology.

14. The method of claim 12, wherein the repository comprises a plurality of versions of the software component representing the virtualized network function, each version being calibrated for a specific runtime platform configuration and/or a specific fronthaul configuration, and wherein querying the at least one software component associated to the construction scheme from the repository is based on a configuration of the runtime platform and/or a constraint of the radio cell's radio access technology.

15. The method of claim 12, further comprising:
monitoring a load of the number of processor cores allocated to the software component; and
changing the number of the processor cores allocated to the software component if a second load condition is satisfied.

16. A non-transitory computer-readable medium storing program instructions that, when executed by a computer or a processor, cause at least one computing platform to perform the method of claim 12.

* * * * *